W. J. PLECKER.
Harvester-Droppers.

No. 138,526.   Patented May 6, 1873.

Witnesses.
Thos. B. Harrison
J. Denning

Inventor.
William J. Plecker.

UNITED STATES PATENT OFFICE.

WILLIAM J. PLECKER, OF BUSHNELL, ILLINOIS.

IMPROVEMENT IN HARVESTER-DROPPERS.

Specification forming part of Letters Patent No. 138,526, dated May 6, 1873; application filed August 26, 1872.

*To all whom it may concern:*

Be it known that I, WILLIAM J. PLECKER, of Bushnell, in the county of McDonough, in the State of Illinois, have invented a new and Improved Side-Delivery Drop for Reapers; and I do hereby declare that the following is a full and exact description thereof, reference being had to the accompanying drawing and to the letters of reference marked thereon, in which—

Figure 1:
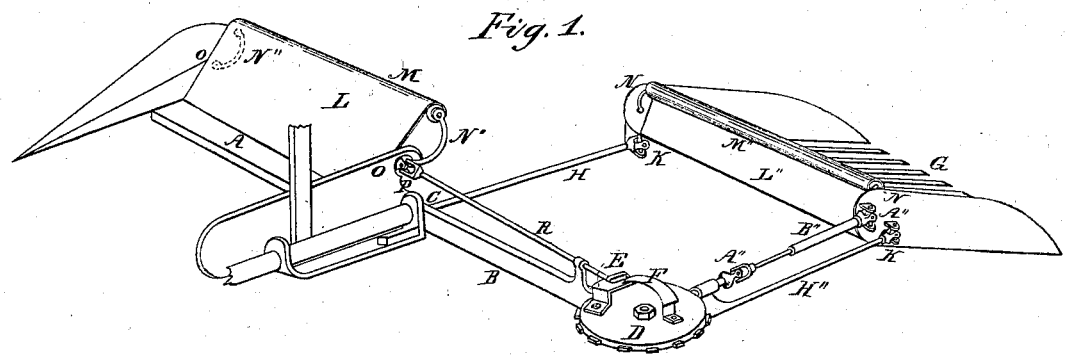
Figure 3:
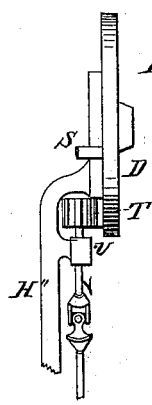
Figure 2:
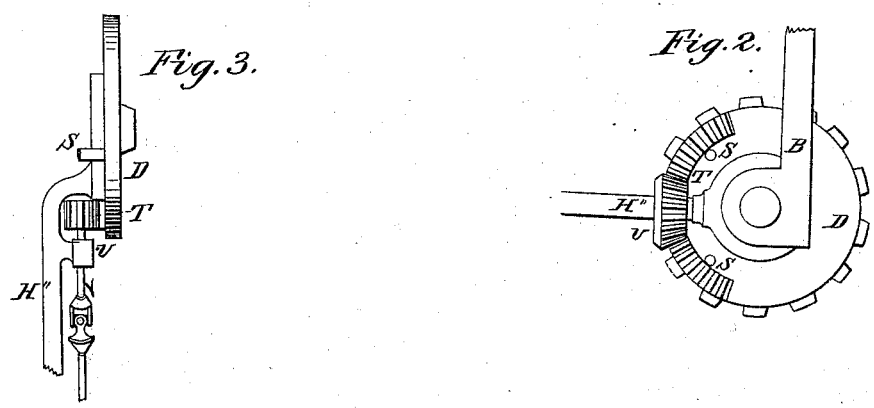

Figure 1 is a perspective view. Fig. 2 is a plan of a portion of the machine, and Fig. 3 an elevation of the same.

A represents the sickle-bar; B, brace-bar, hinged at C to the sickle-bar; D is a horizontal disk or wheel, having on its rim projections to engage with the driving-chain, by which it receives motion from the drive-wheels of the reaper. On the upper surface of the disk D is a cam-plate, E, and spring-plate, F. G is a drop-platform, attached to the sickle-bar A and brace-bar B by the two parallel rods H H''. These rods are attached to the drop-platform by universal joints K K, and to the sickle-bar and brace-bar by pivot-joints. L L'' are two aprons, capable of being rolled upon the rollers M M'', inside of which is a coiled spring. The rollers M M'' are attached to two crank-arms, N N'', pivoted to the divide-boards at O O by the motion of the cranks N N. The roller is elevated to the position shown in the drawing, or lowered to the level of the sickle-bar. The crank N'' is coupled by means of the universal joint P to the rod R, having its other extremity bent at right angles, so as to engage with the cam-plates E and F. The under surface of the disk D is provided with two stop-pins, S S, Figs. 2 and 3, and with a cogged segment, T. The arm H'' revolves upon the same pivot as the disk D. Attached to the arm H'' is the pinion U, which engages with the cogged segment T, shown in Fig. 3. The pinion U is secured to the rod V, which passes through the projection on the rod H, and is provided with universal joints at A'' A''. The rod V is adjustable as to length by sliding within the square sleeve B''. The use of the rod V is to revolve the crank N and operate the apron on the platform G.

The operation of the machine is as follows: The drop-platform G being in contact with the sickle-bar A, the aprons L and L'' being rolled upon their respective rollers, and the rollers depressed to the level of the sickle-bar, the machine is in position to receive the sheaf. As soon as a sufficient quantity of grain has accumulated on the platform to form a sheaf power is imparted to the disk D. The revolution of the disk by the segment T causes the pinion U and rod V to make a half revolution. This, by the crank N, elevates the apron L'' and divides the sheaf on the platform from the grain being cut by the sickle. By the further revolution of the disk D the pin S comes in contact with the arm H'', causing it to revolve on its pivot and carrying the platform G to rear of the driving machinery of the reaper, when the parallel rods H and H'' are at right angles with the platform G. Then the universal joints K are in such a position as to allow the points of the fingers at the rear of the platform G to drop for the purpose of delivering the grain. By the motion of the disk D immediately after the raising of the divide-apron L'' the cam-plate E comes in contact with the small crank on the end of the rod R, causing it to revolve sufficiently to raise the apron L to its full height, to retain the grain being cut during the transit of the platform G. On the reversing of the motion of disk D the platform G will be brought to its first position at the rear of the sickle-bar A. During this return motion the revolution of the rod V by the segment T and pinion U lowers the roller M''. The action of the coiled spring within the roller causes it to roll upon itself the apron L'' as it approaches the level of the platform. During the return of the platform G the apron L is retained at its full elevation by the action of the spring-plate F until the platform nearly touches the apron L. The plate F then ceases to operate on the end of the rod R, thus allowing the roller M to return to its first position on a level with the sickle-bar and delivering the grain retained by it to the platform G.

Having thus described my invention, I claim as new and desire to secure by Letters Patent—

1. The combination of apron L, roller M, crank N″, rod R, cam and spring plates E and F, and disk D, substantially as and for the purposes described.

2. The combination of apron L″, roller M″, crank N, rod V, pinion U, and segment T, substantially as and for the purposes described.

3. In combination with the elements recited in the preceding claims, the platform G, arms H and H″, and universal joints K K, substantially as and for the purpose described.

WILLIAM J. PLECKER.

Witnesses:
D. H. BODINE,
R. T. LINDSAY.